US005683068A

United States Patent [19]
Chase et al.

[11] Patent Number: 5,683,068
[45] Date of Patent: Nov. 4, 1997

[54] TILT/SWIVEL SUPPORT FOR PERSONAL COMPUTER MONITOR

[75] Inventors: Steven B. Chase, Cupertino; James K. Levins, Santa Clara; Elizabeth B. Diaz, Woodside, all of Calif.

[73] Assignee: Apple Computer, Inc., Cupertino, Calif.

[21] Appl. No.: 415,319

[22] Filed: Apr. 3, 1995

[51] Int. Cl.⁶ .................................................. A47G 29/00
[52] U.S. Cl. .......................... 248/371; 248/920; 248/923
[58] Field of Search ...................................... 248/919, 920, 248/921, 923, 371, 349.1, 183.1; 312/223.2, 7.2

[56] References Cited

U.S. PATENT DOCUMENTS

| | | | |
|---|---|---|---|
| 4,880,191 | 11/1989 | Lake, Jr. ............................. | 248/923 X |
| 5,209,446 | 5/1993 | Kawai ................................. | 248/920 X |
| 5,465,936 | 11/1995 | Wang .................................. | 248/921 X |
| 5,518,216 | 5/1996 | Wu ..................................... | 248/923 X |

Primary Examiner—Ramon O. Ramirez
Attorney, Agent, or Firm—Burns, Doane, Swecker & Mathis, LLP

[57] ABSTRACT

An appliance such as an all-in-one personal computer unit is mounted on a support assembly which provides for horizontal swiveling and vertical tilting of the computer unit. The support assembly includes three pieces, namely, base, swivel and tilt members mounted one upon the other and interconnected by snap-in connections. The center of gravity of the computer unit lies substantially on vertical and horizontal axes of rotation of the support structure.

25 Claims, 5 Drawing Sheets

TILT/SWIVEL SUPPORT FOR PERSONAL COMPUTER MONITOR

BACKGROUND OF THE INVENTION

The present invention relates to a personal computer and, in particular, to a support structure for a personal computer.

The use of personal computers is made more convenient by being able to reorient the monitor to accommodate various user orientations, i.e., to be able to swivel the monitor to the right or left, and/or tilt the monitor up or down.

It is conventional, for example, to mount a monitor of a personal computer on a tilt/swivel support which enables the monitor to be swiveled to the right or left and tilted up or down, to accommodate the user orientation. The monitor would be electrically connected to operating components disposed in a separate chassis. The monitor and tilt/swivel support could be seated upon that separate chassis.

The tilt/swivel support could be separate from the monitor in the sense that the user first places the tilt/swivel support on a table and then positions the monitor on the base. Alternately, the monitor could have an integrated tilt/swivel structure.

However, it has been difficult to satisfactorily provide a tilt/swivel expedient in connection with relatively large, heavy personal computers of the so-called "all-in-one" type wherein the monitor shares a common chassis with the monitor operating equipment (memory board, power supply, disc drive, etc.). In typical use, such an all-in-one computer is placed directly upon a support surface, e.g., a table top, whereby a reorienting of the monitor about a vertical axis involves shifting the base of the computer across the support surface, unless the user elects to lift the heavy unit off the support surface during the reorienting step. Furthermore, the orientation of the monitor relative to a horizontal axis is fixed; that is, the monitor cannot be tilted up or down unless an object is placed under the front or rear portion of the bottom wall to raise that portion.

Therefore, it would be desirable to provide a support structure for enabling the monitor of an all-in-one computer to be swiveled and/or tilted.

SUMMARY OF THE INVENTION

One aspect of the present invention relates to a supporting structure for supporting a body on a support surface for tilting and swiveling movements. The supporting structure comprises a stationary base member adapted to rest on a support surface, a swivel member mounted on the base member for rotation relative thereto about a vertical axis, and a tilt member mounted on the swivel member for rotation relative thereto about a horizontal axis. The body can be fixedly mounted on the tilt member.

Preferably, the swivel member is connected to the base member by a first snap-in connection, and the tilt member is connected to the swivel member by a second snap-in connection.

The first snap-in connection preferably comprises a plurality of upright snap fingers arranged in a generally circular pattern on either the base member or the swivel member and positioned to enter a cylindrical hole formed in the other of the base and swivel members. The hole defines the vertical axis of rotation for the swivel member.

Preferably, the second snap-in connection comprises two rows of snap arms, each row extending in a direction of tilting movement of the tilt member and being formed on either the tilt member or the swivel member. The rows of snap arms are disposed on opposite sides of the vertical axis and are arranged to enter a slot formed in the other of the tilt and swivel members.

The swivel member preferably includes a concave top surface, and the tilt member comprises a convex bottom surface. One of those surfaces, preferably the top surface, includes a plurality of bumps against which the other surface bears.

The computer preferably includes a housing encompassing the chassis to form therewith a computer unit. A center of gravity of the computer unit lies substantially on the vertical axis of rotation of the swivel member and substantially on the horizontal axis of rotation of the tilt member.

The present invention also relates to the support member per se and to the tilt structure per se.

BRIEF DESCRIPTION OF THE DRAWINGS

The objects and advantages of the invention will become apparent from the following detailed description of a preferred embodiment thereof in connection with the accompanying drawings in which like numerals designate like elements and in which.

DETAILED DESCRIPTION OF A PREFERRED EMBODIMENT OF THE INVENTION

Figure 1:
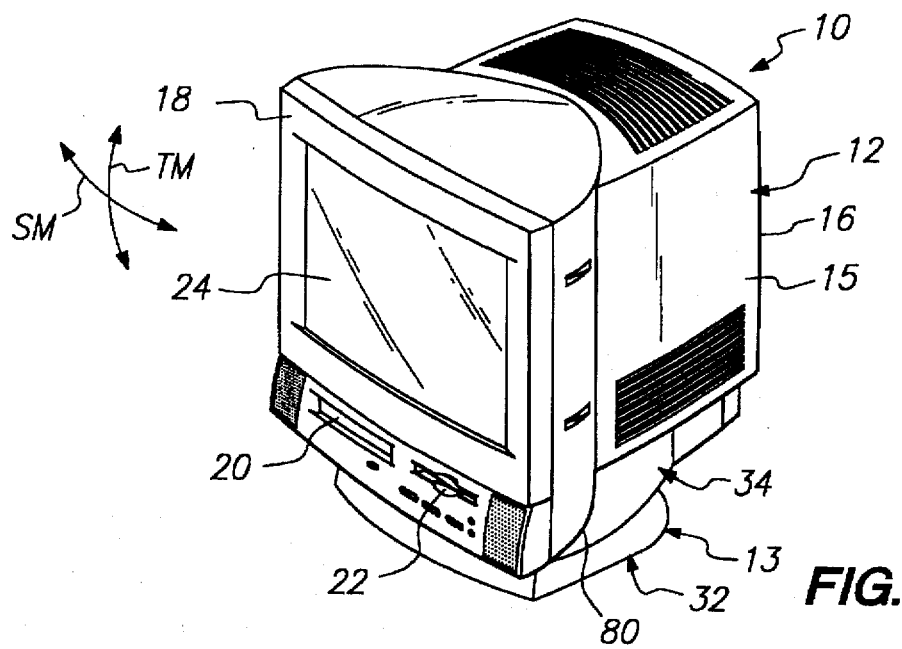
FIG. 1 is a top, front, right perspective view of a personal computer unit mounted on a tilt/swivel support member according to the present invention.
Figure 2:
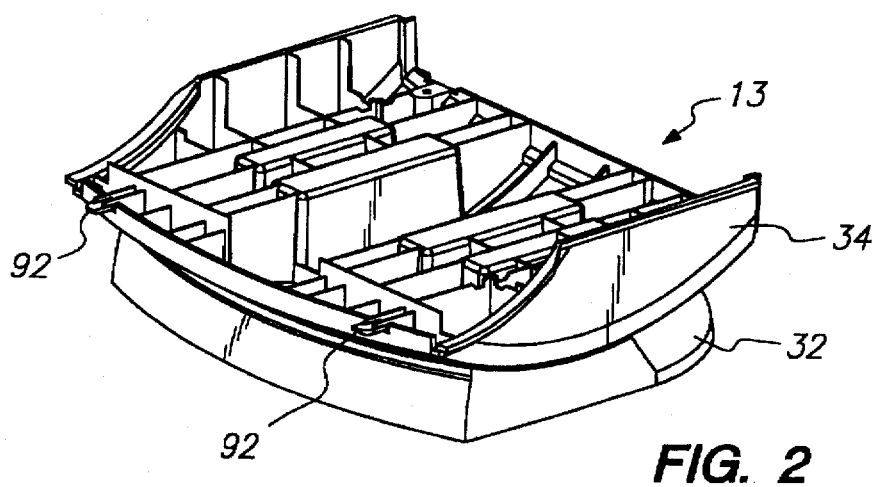
FIG. 2 is a top front, right perspective view of the tilt/swivel support member in an assembled condition.
Figure 3:
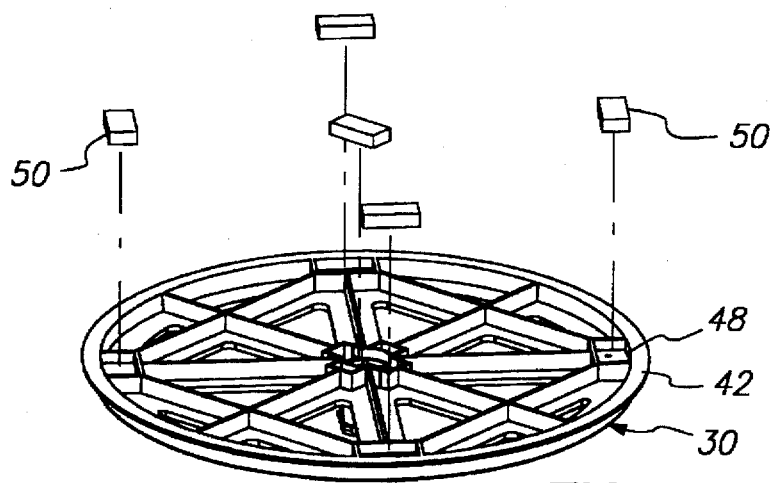
FIG. 3 is a bottom perspective view of a base member of the tilt/swivel support structure.
Figure 10:
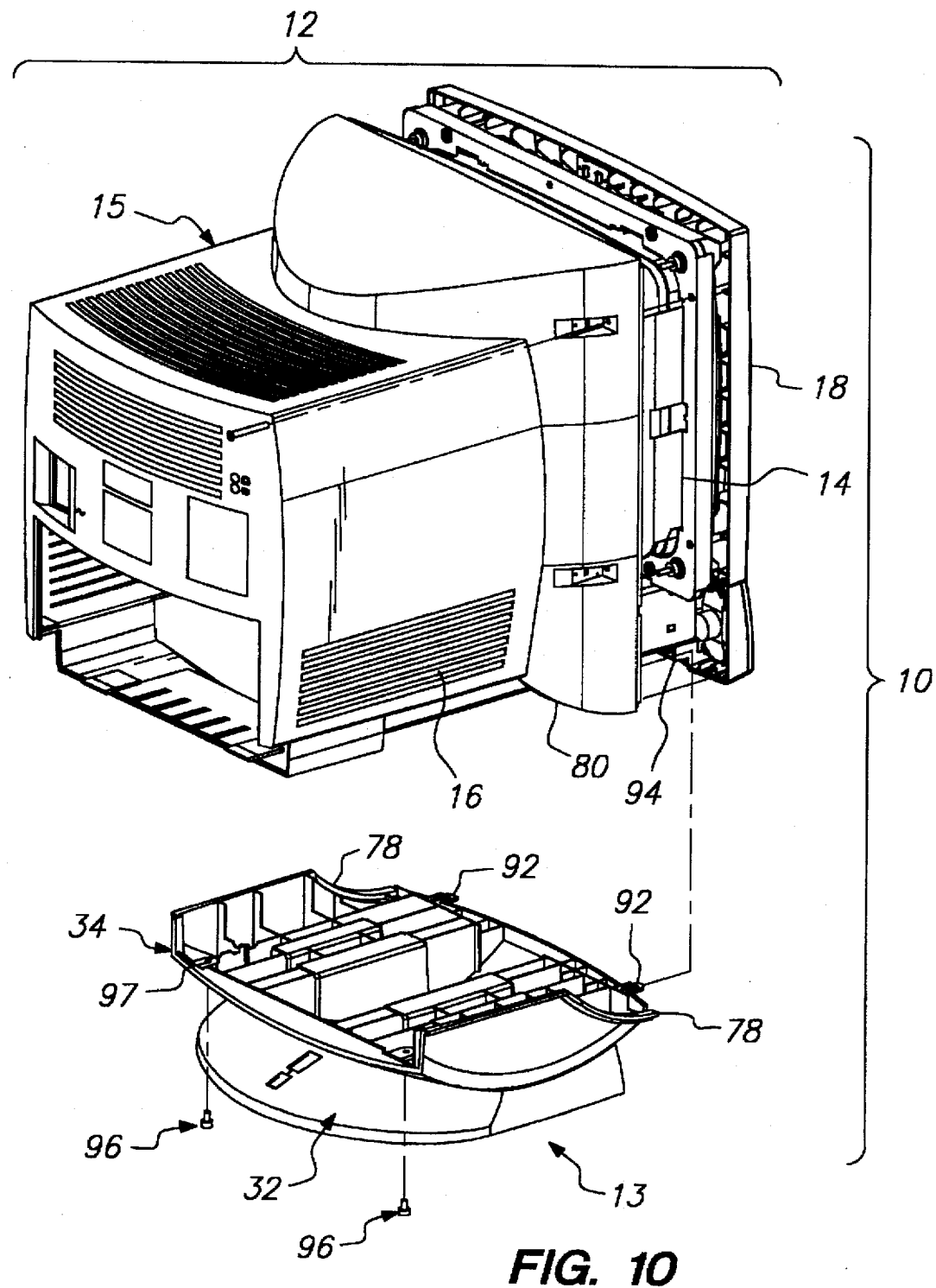
FIG. 10 is an exploded perspective view of an all-in-one computer unit and the tilt/swivel support structure, with the all-in-one computer unit also being shown in an exploded state.

Depicted in FIG. 1 is a personal computer 10 comprised of a computer unit 12 and a tilt/swivel support structure 13 for the computer unit 12. As shown in FIG. 10, the computer unit 12 is comprised of a metal chassis 14 surrounded by a housing assembly 15. The housing assembly 15 comprises a rear housing portion 16 and a front housing portion or bezel 18. Those front and rear housing portions 16, 18, which can be formed of plastic, for example, are shown in a disassembled condition in FIG. 10 to expose a front portion of the chassis 14. The chassis contains a conventional monitor 24 and operating equipment for the monitor 24, such as a mother board (not shown), power supply (not shown), disc drives 20, 22, etc. Thus, the computer unit 12 is of the "all-in-one-type" wherein the monitor 24 shares a common chassis 14 with its operating equipment.

The tilt/swivel structure 13 is constructed so that the center of gravity of the computer lies substantially on vertical and horizontal axes of rotation of the tilt/swivel support structure 13, as will be discussed.

The supporting assembly 13 and the computer unit 12 are designed to mate with one another in order to provide a conforming overall appearance. In particular, the supporting assembly 13 is comprised of three parts 30, 32, 34 which snap together by means of snap-in connections to provide swiveling and tilting movements SM, TM for the computer unit 12 (see FIG. 1). Those three parts consist of a base member 30, a swivel member 32, and a tilt member 34, each preferably molded in one piece from a suitable plastic material.

The base member 30 comprises a center disc 40 having an annular lower rim 42 projecting radially outwardly, and resilient snap fingers 44 projecting upwardly. The snap fingers 44 are arranged in an annular pattern about a vertical axis A. Each snap finger 44 includes a laterally extending locking head 46 having a top bevel 47. Disposed in the underside of the disc 40 are rectangular recesses 48 adapted to receive rubber feet 50 that can be held in the recesses by adhesive. The feet 50 project slightly below the underside of the rim 42 (see FIG. 4) to rest upon a supporting surface S.

The swivel member 32 includes a body having a concave top surface 54 forming front and rear edges 53, 55. The top surface 54 comprises a segment of a toroidal surface, although other shapes, such as cylindrical, could be used. Disposed in the top surface 54 are parallel guide slots 56 extending in a front-to-rear direction. Projecting upwardly from the body in one-piece construction therewith are two parallel snap structures each comprised of a row of upwardly projecting snap arms 58. Each row contains a plurality of snap arms 58, e.g., three arms in the disclosed embodiment, although each row could alternatively comprise a single elongated snap arm.

The rows extend in front-to-rear directions and are spaced apart in a direction parallel to the above-mentioned axis to be situated on opposite sides of a hollow upright cylindrical center tube 59. The axis A coincides with the longitudinal axis of the tube 59. At its upper end, each snap arm 58 includes a laterally projecting locking head 60 having a top bevel 62. Undersides of the locking heads form locking shoulders 64, whereby the locking shoulders 64 of each row of snap arms 58 together form a discontinuous, curved guide surface arranged coaxially with the surface 54.

Figure 6:
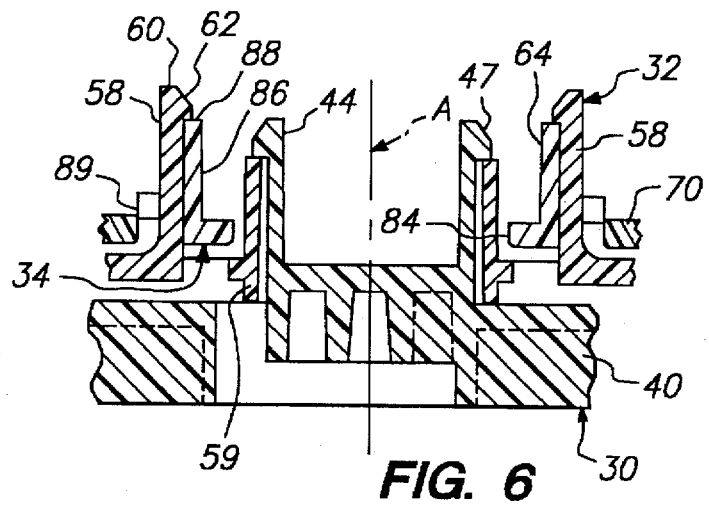
FIG. 6 is a vertical sectional view through a center portion of the tilt/swivel support structure depicting the manner in which the base, swivel, and tilt members are interconnected by snap-in connections.
Figure 7:
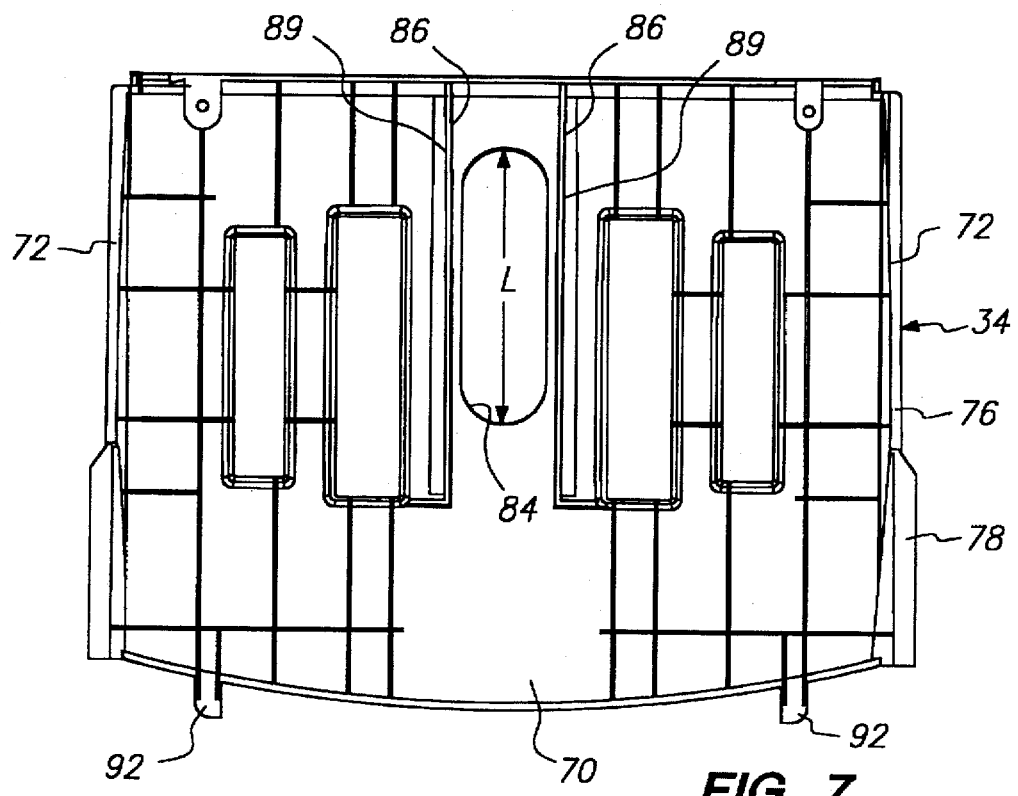
FIG. 7 is a top plan view of the tilt member.
Figure 5:
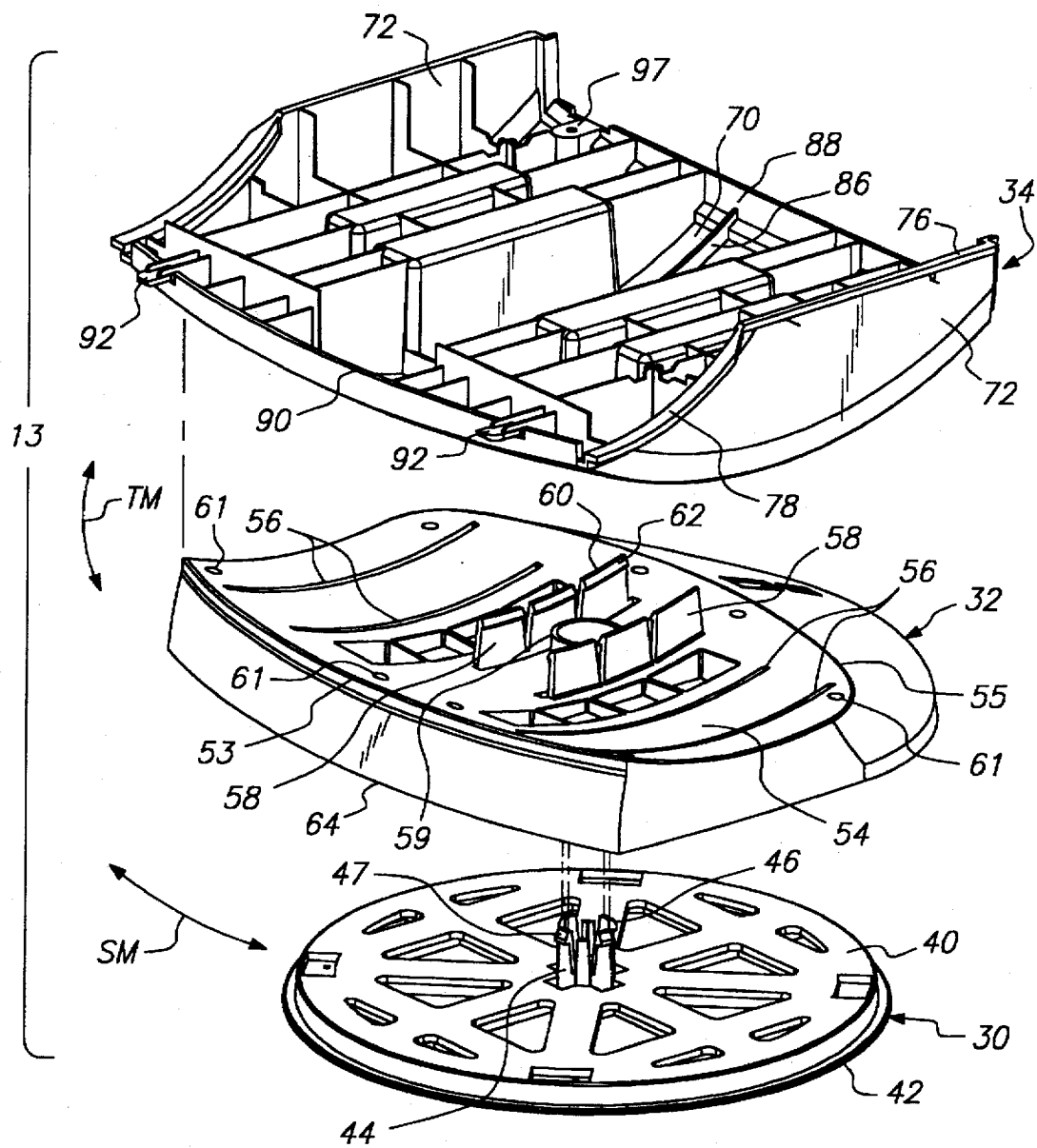
FIG. 5 is an exploded top, right perspective view of the tilt/swivel support structure.
Figure 9:
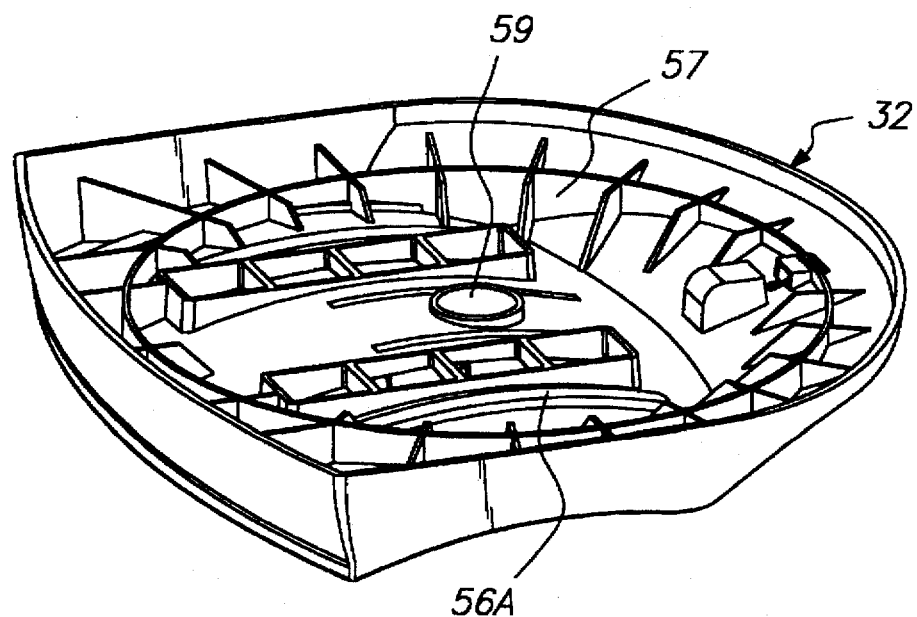
FIG. 9 is a bottom perspective view of the swivel member.

The inside diameter of the tube 59 is dimensioned to enable the snap fingers 44 to travel vertically therethrough in a radially inwardly deflected condition, whereupon the locking heads 46 snap radially outwardly into overlying relationship to an upper edge of the tube 59 as shown in FIG. 6. The underside of the swivel portion 32 includes a downwardly projecting, annular rib 57 (see FIG. 9) arranged to rest slidably upon the disc 40.

Projecting upwardly from the top surface 54 are bumps 61 (e.g., eight bumps) for directly supporting the underside of the tilt member 34 as will be explained.

Figure 8:
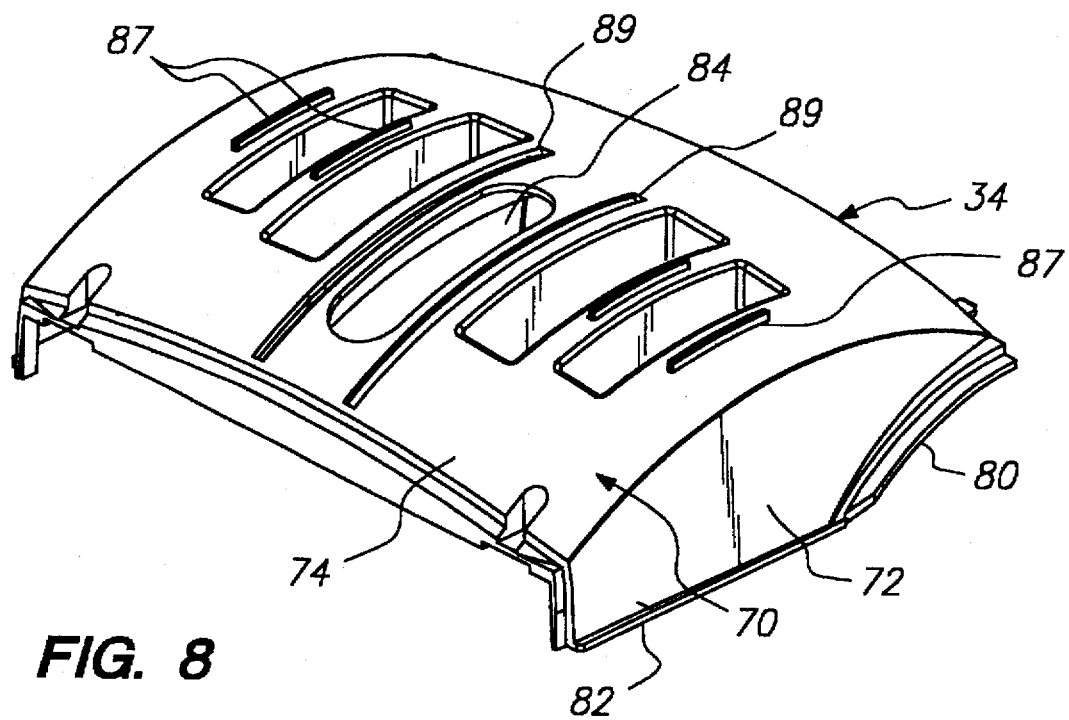
FIG. 8 is a bottom perspective view of the tilt member.

The tilt member 34 includes a bottom wall 70 (see FIG. 8) and a pair of parallel upstanding side walls 72. The bottom wall includes a bottom surface 74 of a shape corresponding generally to that of the surface 54 of the swivel member. The tilt member is able to swivel relative to the swivel member about a horizontal axis of rotation.

Each side wall 72 includes an upper edge 76, a front portion 78 of which is concavely curved to conform to a convexly curved portion 80 of the underside of the rear housing portion 16. The rear portion 82 of the edge 76 is horizontally linear to conform to a linear underside of the chassis 14.

Disposed in the center of the bottom wall 70 is an elongated slot 84 extending in a front-to-rear direction. Bordering the slot is a pair of upstanding guide walls 86 having upper edges 88. A slot 89 is disposed along a side of each wall 86 facing away from the slot 84. The spacing between the guide walls 86 is dimensioned to enable the guide walls 86 to travel downwardly between the two rows of snap arms 58 as the snap arms 58 travel through the slots 89, whereupon the locking heads 60 of the snap arms snap inwardly into overlying relationship to the upper edges 88 of the walls 86 (see FIG. 6). Simultaneously, the tube 59 passes through the slot 84.

The length L of the slot 84 is longer than the corresponding lengths of the rows of snap-in arms 58, so that the tilt member 34 can pivot relative to the swivel member 32. The ends of the slot 84 are in the shape of circular segments, corresponding to the diameter of the tube 59 and forming stop surfaces therefore.

Projecting downwardly from the underside of the bottom wall 74 are convex ribs 87 (see FIG. 8) which are sized to enter respective ones of the guide slots 56 to provide vertical support and lateral guidance for the tilt member 34. The ribs 87 engage bottom walls 56A of the slots 56 (see FIG. 9) to aid in supporting the weight of the computer unit 12. That is, the bottom of the tilt member 34 rests upon both the bumps 61 and the bottoms 89 of the slots 56 of the swivel member 32. The ribs 87 are of shorter length than the slots so as to be movable within the slots, whereby the tilt member can be tilted to various positions.

Projecting forwardly from a front edge 90 of the tilt member 34 are two tabs 92 positioned to enter respective slits 94 formed on a lower front edge of the chassis 14 (only one slit depicted in FIG. 10).

Figure 4:
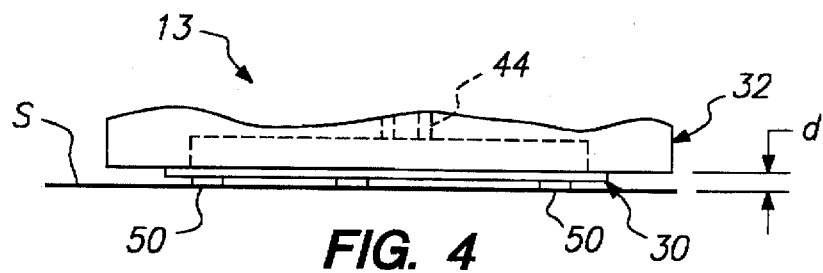
FIG. 4 is a front elevational view of a lower portion of the tilt/swivel support structure resting on a supporting surface.

The support assembly 13 is assembled by pushing the swivel member 32 downwardly onto the base 30 so that the snap fingers 44, due to their bevels 47, are deflected inwardly toward one another as they pass upwardly through the center tube 59. Then the snap fingers rebound outwardly so that the locking heads 46 overlie an upper edge of the tube 59 as shown in FIG. 6. The annular rib 57 of the swivel member 32 comes to rest upon the disc portion 40 of the base, and the disc portion 40 projects upwardly into a hollow of the swivel member 32. The swivel member 32 is thus rotatable relative to the base about the vertical axis A defined by the tube 59. The bottom of the swivel member 32 lies very close to the support surface, e.g., the spacing d in FIG. 4 is less than 5 mm, e.g., about 2 mm.

Either before or after the mounting of the swivel member on the base member, the tilt member 34 is pushed downwardly onto the swivel member to cause the snap arms 58 of each row of snap arms to be deflected outwardly away from the snap arms of the other row (due to the bevels 62) as the guide walls 86 pass downwardly between the rows of snap arms. Then the snap arms 58 rebound inwardly so that their locking heads 60 overlie the upper edges 88 of the walls 86 as shown in FIG. 6. The underside 74 of the bottom wall 70 bears against the bumps 61 of the top surface 54 of the swivel member 32, and the ribs 87 bear against the bottoms 89 of the guide slots 56 of the swivel member 32.

In order to mount the computer unit 12 on the support assembly 13, the computer unit is maneuvered to cause the tabs 92 of the tilt member to be inserted into the slits 94 of the chassis 14. Then, screws 96 are inserted upwardly through holes 97 formed in the tilt member 34 and are threaded into holes (not shown) formed in a rear portion of the underside of the chassis 14. In this condition, a linear rear portion of the chassis rests upon the linear portions 76 of the edges of the tilt member 34, and the convex portions 80 of the rear housing portion 16 rest upon the concavely curved portions 78 of those edges.

The monitor can be oriented in various positions by swiveling the computer unit 12 about the vertical axis A and/or tilting the unit 12 about the horizontal axis of rotation. During rotation about the vertical axis, the computer unit 12, the tilt member 34, and the swivel member 32 rotate relative to the base 30. During tilting rotation about the horizontal axis, the computer unit 12 and tilt member 34 rotate relative to the swivel and base members 32, 30. The underside 74 of the bottom wall 72 of the tilt member 34 slides along the bumps, and the bottoms of the ribs 87 slide along the slot bottoms 89, whereby friction is minimized. Also, the presence of the bumps makes it unnecessary for the surface 54 to be perfectly cylindrical, because the tilt member does not directly contact the surface 54. Lateral guidance as well as vertical support is provided by the ribs 54 disposed in the guide slots 56.

The front of the tilt member 34 extends beyond (i.e., overhangs) the front of the swivel member 32, so that a space is formed beneath such overhang in which a portion of the keyboard can be placed.

The tilting motion is facilitated by designing the all-in-one computer unit 12 and the tilt/swivel structure 13 so that the center of gravity of the computer lies substantially on the vertical and horizontal axes of rotation of the tilt/swivel structure. Hence, the all-in-one computer unit 12 tends to stay in its adjusted positions, despite its considerable weight. In that regard, it has heretofore been considered that one advantage of an all-in-one type of computer is that design engineers can spread the mass components of the chassis around in a horizontal plane without concern for the location of the center of mass. The present invention also takes advantage of being able to horizontally spread apart the components of the chassis, but that is done in a manner creating a balanced arrangement of downward forces on the tilt/swivel member, while locating the center of gravity and close as possible to the vertical and horizontal axes of rotation. The resulting apparatus is thus well balanced around both of those axes.

It will be appreciated that the assembly of the support structure 13 is simple, because only three parts need to be interconnected, and the connections are made by simple snap-in couplings merely requiring the application of vertical force. The assembly can also be easily disassembled by bending the snap-fingers and snap-arms to non-securing positions. The removal of the tilt member from the swivel member is particularly convenient since it is only necessary to begin the removal of the tilt member from one end of the snap-arm arrangement and then continue that removal toward the opposite end, whereby the members become, in effect, "unzipped" from one another.

The support structure facilitates the use of the computer unit 12. For instance, when the computer unit 12 is swiveled, not only is the monitor screen swiveled, but the control buttons and disc drive as well, so that the user who has swiveled the unit now faces those buttons and disc drive to facilitate the manipulation thereof. Tilting movements are facilitated due to the low friction provided by the surface-to-bump (and rib-to-slot bottom) engagement, in contrast to a surface-to-surface engagement. Also, since the center of gravity of the computer unit 12 lies substantially on the horizontal and vertical axes of the tilt/swivel structure, the computer unit 12 tends to stay in its various adjusted positions, despite its considerable weight.

Since the computer unit 12, tilt member 34, and swivel member 32 all swivel together about a vertical axis, the appearance of the apparatus never changes as would occur if any of the computer unit 12, tilt member 34, and swivel member 32 were to swivel relative to one another. Also, since the base member 30 is hidden from view, any change in the appearance of the apparatus relative tot he base member during swiveling of the computer will not be noticeable.

The support assembly is comprised only of snap-in members and does not rely upon screws which could be over-tightened and inhibit proper rotation of the parts.

While the invention has been described above for use in conjunction with a personal computer, it could be used to support any type of equipment in which tilting and swiveling are beneficial.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A tilt/swivel supporting structure for supporting a body on a support surface for tilting and swiveling movements, respectively, said supporting structure comprising:

a stationary base member adapted to rest on the support surface;

a swivel member mounted on said base member by a first snap-in connection for rotation relative thereto about a vertical axis; and a tilt member mounted on said swivel member by a second snap-in connection for rotation relative thereto about a horizontal axis and adapted to receive said body;

said first snap-in connection including a first group of upright flexible snap fingers of one-piece construction with one of said swivel member and said base member, said first group of snap fingers arranged in a generally circular pattern and positioned to enter a cylindrical hole formed in the other of said base member and said swivel member, said hole defining said vertical axis of rotation for said swivel member, and said second snap-in connection including a second group of flexible snap fingers of one-piece construction with one of said tilt member and said swivel member.

2. The tilt/swivel supporting structure according to claim 1, wherein said base member includes a smaller outer periphery than said swivel member, an upper portion of said base disposed within an interior space formed by said swivel member.

3. The tilt/swivel supporting structure according to claim 1, wherein said base, swivel, and tilt members are formed of a plastic material.

4. The tilt/swivel supporting structure according to claim 1, wherein said snap fingers of said first group are formed on said base member and extend vertically upwardly.

5. The tilt/swivel supporting structure according to claim 1, wherein said second group of snap fingers comprises two parallel snap structures, each snap structure being curved and extending in a direction of tilting movement of said tilt member and formed on one of said tilt and swivel members, said snap structures disposed on opposite sides of said vertical axis and arranged to enter a slot formed in the other of said tilt and swivel members, each snap structure forming a curved shoulder overlying a surface on the other of said tilt and swivel members to oppose uncoupling of said tilt and swivel members.

6. The tilt/swivel supporting structure according to claim 5, wherein said snap structures are formed on said swivel member.

7. The tilt/swivel supporting structure according to claim 6, wherein said cylindrical hole is formed by a tubular portion of said swivel member, said tubular portion projecting upwardly through said slot formed in said tilt member.

8. A tilt/swivel supporting structure for supporting a body on a support surface for tilting and swiveling movements, respectively, said supporting structure comprising:

a stationary base member adapted to rest on the support surface;

a swivel member mounted on said base member by a first snap-in connection for rotation relative thereto about a vertical axis; and a tilt member mounted on said swivel member by a second snap-in connection for rotation relative thereto about a horizontal axis and adapted to receive said body;

wherein said swivel member includes a concave top surface, and said tilt member comprises a convex bottom surface, one of said concave and convex surfaces including a plurality of bumps against which the other of said concave and convex surfaces bears.

9. A tilt/swivel supporting structure for supporting a body on a support surface for tilting and swiveling movements, respectively, said supporting structure comprising:

a stationary base member adapted to rest on the support surface;

a swivel member mounted on said base member by a first snap-in connection for rotation relative thereto about a vertical axis; and a tilt member mounted on said swivel member by a second snap-in connection for rotation relative thereto about a horizontal axis and adapted to receive said body;

wherein said second snap-in connection comprises two parallel snap structures, each being curved and extending in a direction of tilting movement of said tilt member and formed on tone of said tilt and swivel members, said snap structures disposed on opposite sides of said vertical axis and arranged to enter a slot formed in the other of said tilt and swivel members, each snap structure forming a curved shoulder overlying a surface on the other of said tilt and swivel members to oppose uncoupling of said tilt and swivel members.

10. The tilt/swivel supporting structure according to claim 9, wherein each of said snap structures comprises a row of relatively flexible snap arms.

11. A tilt/swivel supporting structure for supporting a body on a support surface for tilting and swiveling movements, respectively, said supporting structure comprising:

a stationary base member adapted to rest on the support surface;

a swivel member mounted on said base member by a first snap-in connection for rotation relative thereto about a vertical axis; and a tilt member mounted on said swivel member by a second snap-in connection for rotation relative thereto about a horizontal axis and adapted to receive said body;

said first snap-in connection including flexible snap fingers of one-piece construction with one of said swivel member and said base member, and said second snap-in connection including flexible snap fingers of one-piece construction with one of said tilt member and said swivel member;

wherein said swivel member includes a concave top surface, and said tilt member comprises a convex bottom surface, one of said concave and convex surfaces including a plurality of bumps against which the other of said concave and convex surfaces bears.

12. The tilt/swivel supporting structure according to claim 11, wherein one of said concave and convex surfaces includes a plurality of ribs extending in said direction of tilting movement of said tilt member, and the other of said tilt and swivel members includes slots in which respective ones of said ribs is movably disposed.

13. In combination, a body and a tilt/swivel supporting structure for supporting said body, said tilt/swivel supporting structure comprising:

a stationary base member adapted to rest on the support surface;

a swivel member mounted on said base member for rotation relative thereto about a vertical axis; and a tilt member mounted on said swivel member for rotation relative thereto about a horizontal axis and supporting said body;

wherein a center of gravity of said body lies substantially on said horizontal axis.

14. The combination according to claim 13, wherein said center of gravity lies substantially on said vertical axis.

15. In combination, a body and a tilt/swivel supporting structure for supporting said body, said tilt/swivel supporting structure comprising:

a stationary base member adapted to rest on the support surface;

a swivel member mounted on said base member for rotation relative thereto about a vertical axis; and a tilt member mounted on said swivel member for rotation relative thereto about a horizontal axis and supporting said body;

wherein a center of gravity of said body lies substantially on said vertical axis.

16. A support assembly for a body, comprising:

a base member including a plurality of upwardly extending snap fingers arranged in a generally annular pattern;

a swivel member mounted on said base by a first snap-in connection comprised of said snap fingers and a circular center hole formed in said swivel member for receiving said snap fingers to lock said base and swivel members against vertical separation and define a vertical axis of rotation of said swivel member relative to said base member, said swivel member including an upper concave surface and two parallel rows of snap arms projecting upwardly from said top surface; and a tilt member mounted on said swivel member by a second snap-in connection comprised of said snap arms and a slot formed through a convex bottom surface of said tilt member, said slot sized to receive said snap arms to lock said tilt and swivel members against vertical separation while permitting tilting movement of said tilt member relative to said swivel member about a horizontal axis.

17. The support assembly according to claim 16, wherein said top surface includes upwardly projecting bumps upon which said bottom surface of said tilt member rests.

18. The support member according to claim 16, wherein said top surface includes parallel slots, and said bottom surface includes ribs extending into said slots and supported on bottom surfaces thereof, said ribs and slots extending in the direction of tilt movement.

19. The support member according to claim 16, wherein said base member has a smaller outer periphery than said swivel member, and an upper portion of said base member projects upwardly into a hollow space formed by said swivel member.

20. The support member according to claim 19, wherein said base member extends below said swivel member by a distance less than 5 mm.

21. The support member according to claim 20, wherein said distance is about 2 mm.

22. A tilt/swivel supporting structure for supporting a body on a support surface for tilting and swivelling movements, respectively, said supporting structure comprising:

a stationary base member adapted to rest on the support surface;

a swivel member mounted on said base member by a first snap-in connection for rotation relative thereto about a vertical axis; and a tilt member mounted on said swivel member by a second snap-in connection for rotation relative thereto about a horizontal axis and adapted to receive said body;

wherein said first snap-in connection comprises a plurality of upright snap fingers arranged in a generally circular pattern on one of said base and swivel members and positioned to enter a cylindrical hole formed in the other of said base and swivel members, said hole defining said vertical axis of rotation for said swivel member.

23. A tilt structure for an object, comprising a lower member having a curved top surface, and an upper member having a curved bottom surface mounted on said top surface, said top and bottom surfaces forming a concave-convex interface permitting said upper member to move in a tilting direction about a horizontal axis, one of said surfaces including a slot extending in said tilting direction, the other of said surfaces including two parallel snap structures extending in said tilting direction and arranged to pass through said slot, each snap structure including a curved locking shoulder extending in said tilting direction and arranged to prevent separation of said members from one another while permitting said tilting movement.

24. The tilt structure according to claim 23, wherein one of said surfaces includes bumps on which the other surface rides during the tilting movement.

25. The tilt structure according to claim 24, wherein one of said surfaces includes outwardly projecting ribs extending in said tilt direction and spaced apart along said horizontal axis, the other surface including slots in which respective ones of said ribs are slidably disposed.

* * * * *